(12) United States Patent
O'Connor et al.

(10) Patent No.: US 10,761,312 B2
(45) Date of Patent: Sep. 1, 2020

(54) INTEGRATED VARIABLE VIEW OPTICAL ADAPTER FOR AN OPTICAL SCOPE

(71) Applicant: General Electric Company, Schenectady, NY (US)

(72) Inventors: Ethan Patrick O'Connor, Hamilton, OH (US); David Scott Diwinsky, West Chester, OH (US); Wayne Ray Grady, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 472 days.

(21) Appl. No.: 15/278,541

(22) Filed: Sep. 28, 2016

(65) Prior Publication Data
US 2018/0088311 A1 Mar. 29, 2018

(51) Int. Cl.
*G02B 23/24* (2006.01)
*G02B 26/08* (2006.01)
*G02B 23/02* (2006.01)

(52) U.S. Cl.
CPC ......... *G02B 23/2407* (2013.01); *G02B 23/02* (2013.01); *G02B 23/243* (2013.01); *G02B 26/0833* (2013.01)

(58) Field of Classification Search
CPC .. G02B 23/2407; G02B 23/02; G02B 23/243; G02B 26/0833
USPC ............................ 359/367; 356/241.1–241.6
See application file for complete search history.

(56) References Cited

U.S. PATENT DOCUMENTS

| | | | | |
|---|---|---|---|---|
| 2,482,749 A | * | 9/1949 | Eckert | G01C 1/10 |
| | | | | 33/268 |
| 3,381,120 A | * | 4/1968 | Fleisher et al. | A45C 5/005 |
| | | | | 312/227 |
| 3,485,548 A | * | 12/1969 | Labet | G02B 23/2415 |
| | | | | 359/367 |
| 3,694,094 A | | 9/1972 | Mitchell | |
| | | (Continued) | | |

FOREIGN PATENT DOCUMENTS

DE 29716512 U1 * 10/1997 ........... A61B 1/2676
GB 2 259 582 A 3/1993

OTHER PUBLICATIONS

International Search Report and Written Opinion issued in connection with corresponding PCT Application No. PCT/US2017/52465 dated Dec. 20, 2017.

*Primary Examiner* — George G King
(74) *Attorney, Agent, or Firm* — Dority & Manning, P.A.

(57) ABSTRACT

The present disclosure is directed to an optical adapter for an optical scope. The optical scope includes a tube defining a conduit. The optical adapter is coupled to an end of the tube. The optical adapter defines a proximate end and a distal end. The optical adapter includes a casing defining a longitudinal direction. The casing includes a first wall and a second wall, in which the first wall and the second wall define a first viewing port therebetween. The second wall defines a second viewing port. The optical adapter further includes a hinge coupled to the first wall, a reflecting lens defining a first end separated from a second end in the longitudinal direction, in which the first end is coupled to the hinge, and an actuator coupled to the first wall and to the second end of the reflecting lens. The actuator pivots the reflecting lens about the hinge from a retracted position adjacent to the first wall to an extended position toward the second wall.

22 Claims, 3 Drawing Sheets

(56) References Cited

U.S. PATENT DOCUMENTS

| | | | |
|---|---|---|---|
| 3,795,422 A * | 3/1974 | Robinson | A47C 7/70 |
| | | | 244/122 R |
| 4,699,463 A | 10/1987 | D'Amelio et al. | |
| 5,182,675 A * | 1/1993 | Arbisi | B60R 1/04 |
| | | | 248/473 |
| 5,253,638 A | 10/1993 | Tamburrino et al. | |
| 5,345,339 A | 9/1994 | Knieriem et al. | |
| 6,560,013 B1 | 5/2003 | Ramsbottom | |
| 2002/0103420 A1 | 8/2002 | Coleman et al. | |
| 2005/0027198 A1 * | 2/2005 | Couvillon, Jr. | A61B 8/12 |
| | | | 600/466 |
| 2015/0133775 A1 * | 5/2015 | Kim | A61B 8/4444 |
| | | | 600/425 |

\* cited by examiner

INTEGRATED VARIABLE VIEW OPTICAL ADAPTER FOR AN OPTICAL SCOPE

FIELD OF THE INVENTION

The present subject matter relates generally to optical adapters for optical scopes.

BACKGROUND OF THE INVENTION

Optical scopes are used as an inspection tool to view inside an apparatus such as a gas turbine engine. Optical scopes, such as borescopes, include a removable optical adapter tip at an end of the optical scope. The optical adapter is generally suited for various purposes, such as providing a discrete direction of view. The optical scope, including the optical adapter, is ingressed into the apparatus for viewing and assessing internal components.

Generally if another discrete direction of view is desired, the optical scope must be egressed from the apparatus and the optical adapter is to be removed and replaced with another optical adapter with another discrete direction of view. Egressing and replacing optical adapters results in added time, cost, and difficulty of an inspection and assessment. Additionally, subsequent repeated ingressing may increase risk of damage to the optical scope or components within the apparatus.

Therefore, there is a need for an optical adapter that provides a plurality of viewing directions.

BRIEF DESCRIPTION OF THE INVENTION

Aspects and advantages of the invention will be set forth in part in the following description, or may be obvious from the description, or may be learned through practice of the invention.

The present disclosure is directed to an optical adapter for an optical scope. The optical scope includes a tube defining a conduit. The optical adapter is coupled to an end of the tube. The optical adapter defines a proximate end and a distal end. The optical adapter includes a casing defining a longitudinal direction. The casing includes a first wall and a second wall, in which the first wall and the second wall define a first viewing port therebetween. The second wall defines a second viewing port. The optical adapter further includes a hinge coupled to the first wall, a reflecting lens defining a first end separated from a second end in the longitudinal direction, in which the first end is coupled to the hinge, and an actuator coupled to the first wall and to the second end of the reflecting lens. The actuator pivots the reflecting lens about the hinge from a retracted position adjacent to the first wall to an extended position toward the second wall.

A further aspect of the present disclosure is directed to an optical scope. The optical scope includes a tube defining a conduit and an optical adapter coupled to an end of the tube.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
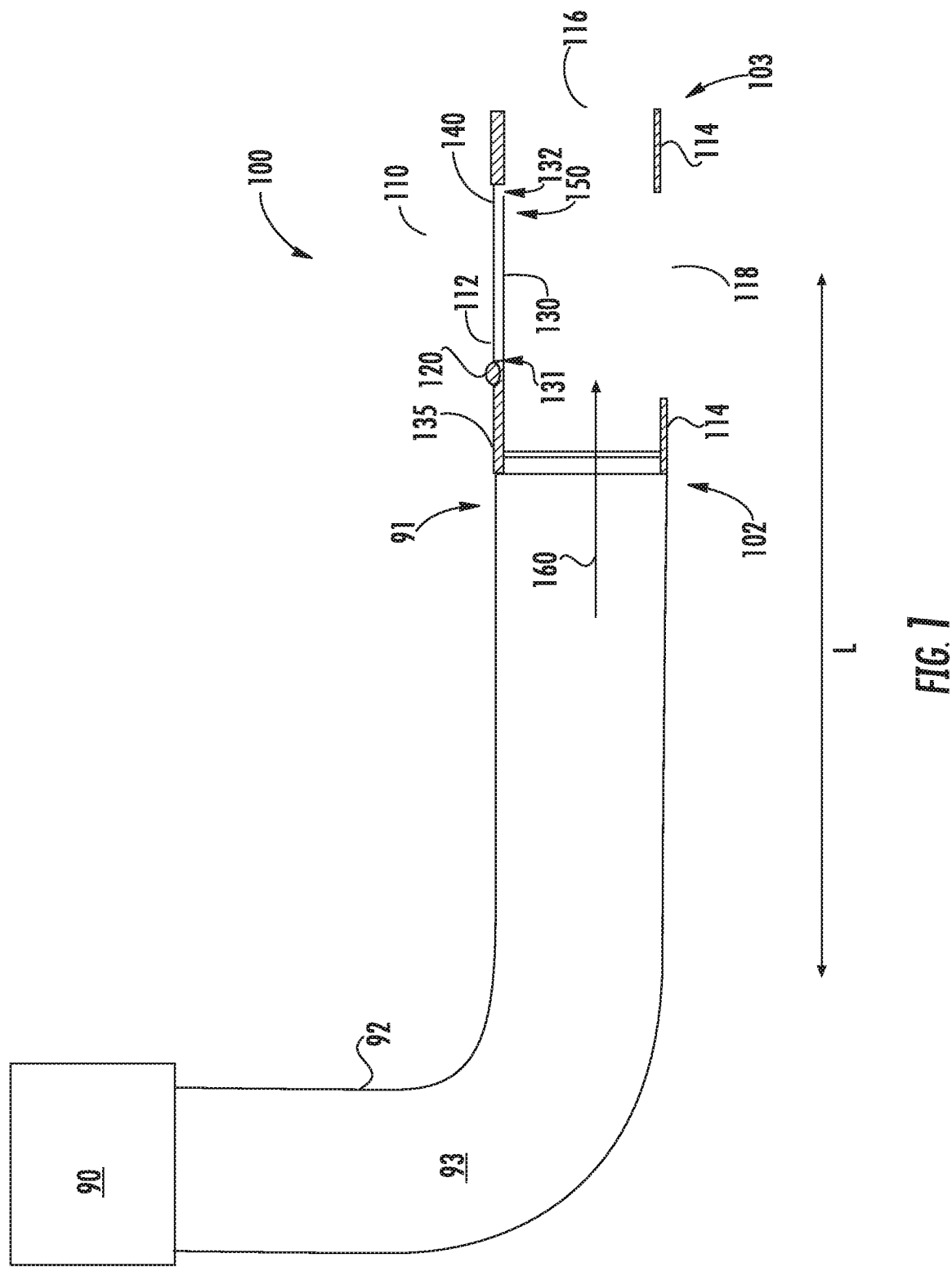
FIG. 1 is an exemplary embodiment of an optical scope including an exemplary optical adapter in a retracted position.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components. The terms "proximate" and "distal" refer to spatial relevance with respect to a datum.

Embodiments of an integrated variable view optical adapter for an optical scope are generally provided. The embodiments of the optical adapter may provide a plurality of viewing directions while obviating the need to remove and replace the optical adapter to acquire a second viewing direction. The optical adapter may provide a first direction of view and a second direction of view using the same optical adapter. In various embodiments, the optical adapter may decrease the risk of damage to the optical scope and/or components within the apparatus (e.g. gas turbine engine) being inspected by decreasing the quantity ingress/egress iterations due to changing optical adapters. Furthermore, the optical adapter may increase inspection and maintenance efficiency, thus reducing costs, by acquiring a plurality of viewing directions from the optical adapter.

Figure 2:
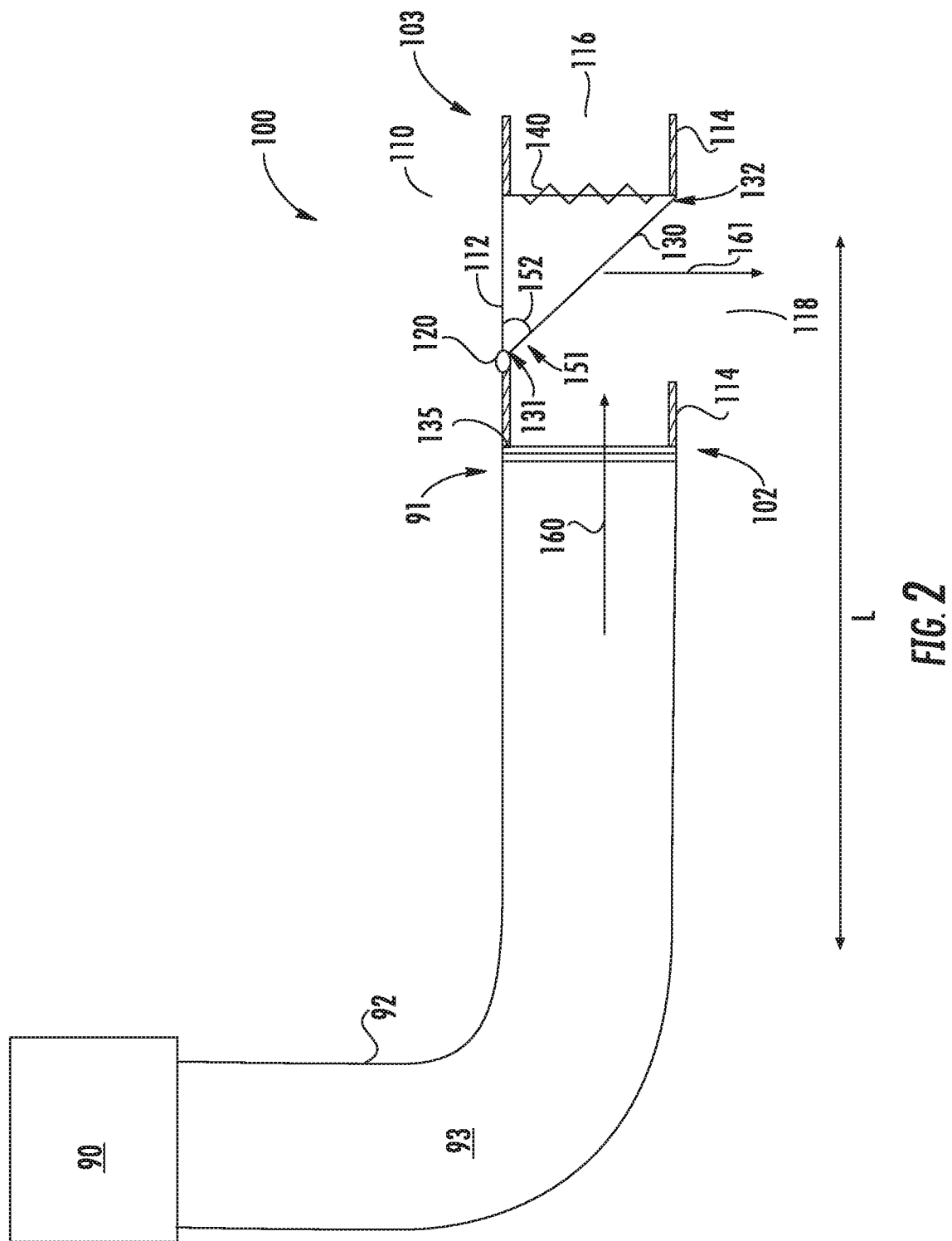
FIG. 2 is an exemplary embodiment of an optical scope including an exemplary optical adapter in an extended position.

Referring now to the drawings, FIGS. 1 and 2 are exemplary embodiments of optical adapters 100 for an optical scope 90. The optical scope 90 includes a tube 92 defining a conduit 93. The optical adapter 100 is coupled to an end 91 of the tube 92. The optical adapter 100 defines a proximate end 102 and a distal end 103. The proximate end 102 is nearest to the end 91 of the tube 92 of the optical scope 90. The distal end 103 is farthest from the end 91 of the tube 92 and of the optical scope 90. The optical adapter 100 is coupled at the proximate end 102 to the end 91 of the tube 92.

The optical adapter 100 includes a casing 110, a hinge, 120, a reflecting lens 130, and an actuator 140. The casing 110 defines a longitudinal direction L extending from the proximate end 102 toward the distal end 103. The casing 110 further includes a first wall 112 and a second wall 114. The first wall 112 and the second wall 114 may extend along longitudinal direction L. The first wall 112 and the second wall 114 define a first viewing port 116 therebetween. The second wall 114 further defines a second viewing port 118. In the embodiment shown in FIGS. 1 and 2, the second viewing port 118 is approximately 90 degrees or perpendicular relative to the first viewing port 116. The reflecting lens 130 may include at least one reflective surface. In one embodiment, the reflecting lens 130 is a mirror. In another embodiment, the reflecting lens 130 is a prism.

The hinge 120 of the optical adapter 100 is coupled to the first wall 112 of the casing 110. The reflecting lens 130 defines a first end 131 disposed toward the proximate end 102 of the optical adapter 100 and a second end 132 disposed toward the distal end 103 of the optical adapter 100. The first end 131 of the reflecting lens 130 is coupled to the hinge 120. In various embodiments of the optical adapter 100 shown in FIGS. 1-3, the hinge 120 may include an assembly including a pin, a knuckle, and leaves. In another embodiment, the hinge 120 is a living hinge made from a portion of the first wall 112.

The actuator 140 of the optical adapter 100 is coupled to the first wall 112 and to the second end 132 of the reflecting lens 130. The actuator 140 extends the reflecting lens 130 to pivot about the hinge 120 from a retracted position 150 (shown in FIG. 1) adjacent to the first wall 112 to an extended position 151 (shown in FIG. 2) toward the second wall 114. In one embodiment of the optical adapter 100, the hinge 120 pivots the reflecting lens 130 to an angle 152 of approximately 45 degrees relative to the first wall 112 in the extended position 151. As shown in FIG. 2, in the extended position 151, the reflecting lens 130 may extend at the angle 152 from the first wall 112 toward the second wall 114. In various embodiments, the hinge 120 may pivot the reflecting lens 130 to the angle 152 of about 0 degrees to about 45 degrees or increments therebetween.

Referring to the embodiments shown in FIGS. 1-2, the optical adapter 100 may operate by adjusting the actuator 140 to move the reflecting lens 130 to change a direction of view. In the retracted position 150, the optical adapter 100 may define a first direction of view 160 along the longitudinal direction L through the first viewing port 116. In the extended position 151, the optical adapter 100 may define a second direction of view 161 through the second viewing port 118. The second direction of view 161 may be approximately 90 degrees or perpendicular to the first direction of view 160. In various embodiments, the second direction of view 161 may be less than approximately 90 degrees to define a second direction of view 161 between the longitudinal direction L and the approximately 90 degrees or perpendicular view.

Figure 3:
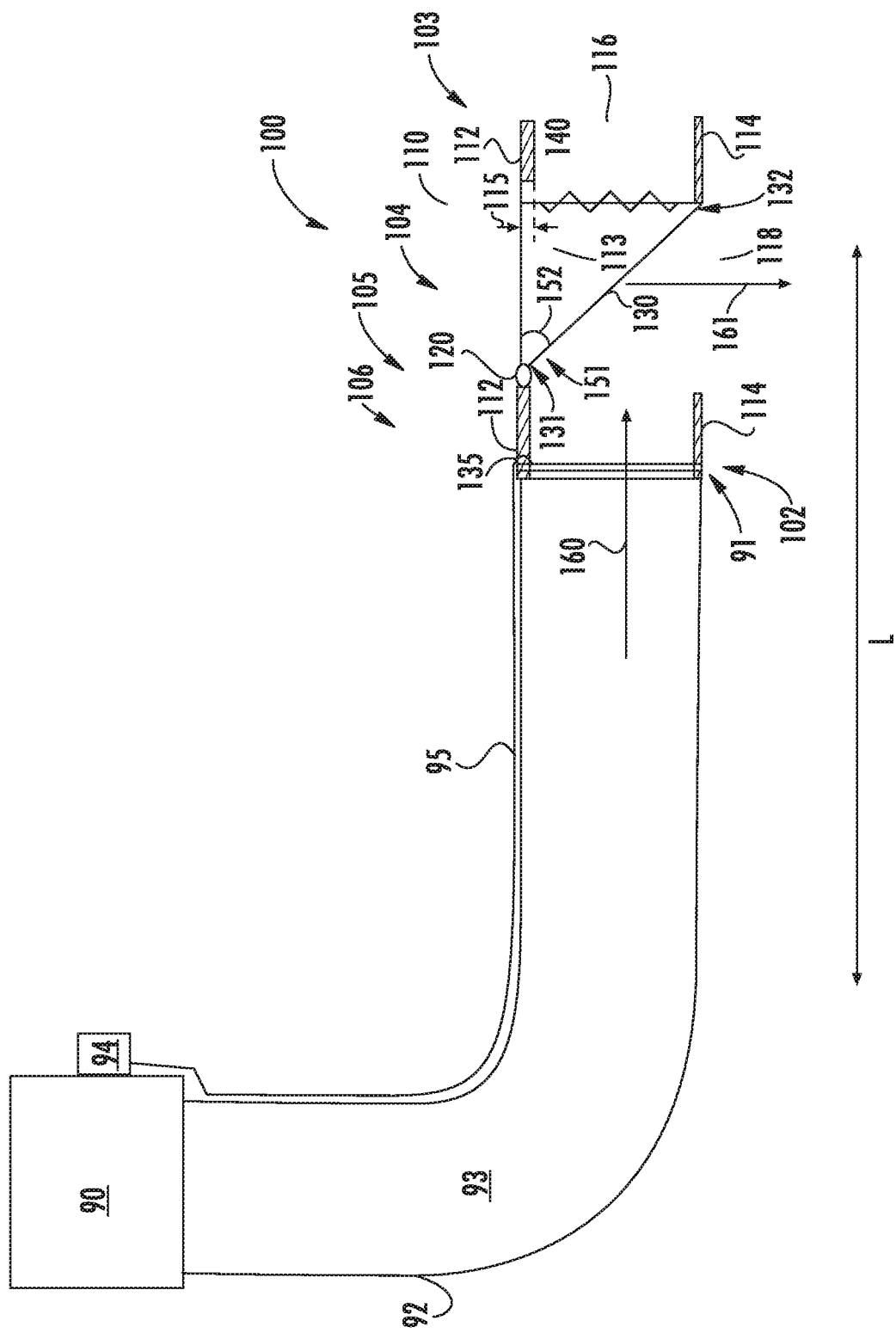
FIG. 3 is another exemplary embodiment of an optical scope including an exemplary optical adapter.

Referring now to FIG. 3, an exemplary embodiment of an optical adapter 100 is shown wherein the first wall 112 defines a recess 113 into which the reflecting lens 130 resides when in the retracted position 150. In one embodiment, the recess 113 may define a depth 115 approximately equal to or greater than a thickness 134 of the reflecting lens 130. The first wall 112 defining the recess 113 may further define the depth 115 to vary, contour, or otherwise conform to the reflecting lens 130 such that the reflecting lens 130 is flush to the first wall 112 when in the retracted position 150. Still further, the first wall 112 defining the recess 113 may define the depth 115 to dispose the hinge 120 within the recess 113 such that the hinge 120 is flush to the first wall 112.

In various embodiments of the optical adapter 100, the first wall 112 and the second wall 114 of the casing 110 may be approximately parallel and extend in the longitudinal direction L from the hinge 120 toward the distal end 103 of the optical adapter 100. In one embodiment, as shown in FIG. 3, the casing 110 defines a rectangular cross sectional area 104 from at least the hinge 120 to the distal end 103 of the optical adapter 100. The first wall 112 may be disposed opposite of the second wall 114. The casing 110 may further include a pair of walls connecting the first wall 112 and the second wall 114. In another embodiment, the casing 110 defines a circular cross sectional area 106 from at least the hinge 120 to the proximate end 102 of the optical adapter 100. In still another embodiment, the casing 110 defines the circular cross sectional area 106 approximately from the hinge 120 to the proximate end 102 of the optical adapter 100 and the rectangular cross sectional area 104 approximately from the hinge 120 to the distal end 103 of the optical adapter 100, and a transition cross sectional area 105 between the circular cross sectional area 106 and the rectangular cross sectional area 104. The transition cross sectional area 105 may be a contoured are in which the proximate end 102 is generally circular and the distal end 103 is generally rectangular. In yet another embodiment, the proximate end 102 of the optical adapter 100 may define threads or snaps to couple the optical adapter 100 to the optical scope 90.

Referring back to FIG. 3, the optical adapter 100 may further include a viewing lens 135 positioned between the first wall 112 and the second wall 114 of the casing 110 toward the proximate end 102 of the optical adapter 100. In other embodiments of the optical adapter 100, the viewing lens 135 may be positioned at the first viewing port 116 between the first wall 112 and the second wall 114, and at the second viewing port 118 within the second wall 114. The viewing lens 135 is a transparent material that focuses light rays to a desired depth of field and/or field of view. In one embodiment, the viewing lens 135 is an assembly of transparent materials collectively focusing light rays. For example, the viewing lens 135 may be a single transparent material defining a curvature. As another non-limiting example, the viewing lens 135 may be a plurality of transparent materials. In another embodiment, the viewing lens is a prism. In still another embodiment, the viewing lens 135 is a combination of prisms and other transparent materials.

In one embodiment of the optical adapter 100, the viewing lens 135 provides a single two-dimensional image at either the first direction of view 160 or the second direction of view 161. In another embodiment, the viewing lens 135 may provide a pair of two-dimensional images at an offset field of view from one another at either the first direction of view 160 or the second direction of view 161. For example, the viewing lens 135 may include a transparent material or prism that divides the field of view into a pair of two-dimensional images at an offset field of view from one another. As another non-limiting example, the viewing lens 135 is a dual aperture lens or a plurality of lenses that provide a stereo view of an object. The pair of two-dimensional images may be provided as a side-by-side display to the optical scope 90. The offset field of view between the pair of images may provide for length, width, or depth measurements of objects in view of the pair of two-dimensional images.

Referring back to FIG. 3, in one embodiment of the optical adapter 100, the actuator 140 is a mechanical linkage to the first wall 112 and the second end 132 of the reflecting lens 130 that moves the reflecting lens 130 from the retracted position 150 (shown in FIG. 1) to the extended position 151 (shown in FIGS. 2 and 3). In another embodiment, the actuator 140 is a microactuator that displaces the second end 132 of the reflecting lens 130 through the transmission of an amount of energy. In various embodiments, the actuator 140, as a microactuator, may include electrostatic, electromagnetic, or piezoelectric microactuators.

Referring still to FIG. 3, one embodiment of the optical scope 90 may further include an energy supply 94 that provides an input energy 95 to the actuator 140. The input energy 95 may activate the actuator 140, as an electromagnetic microactuator, to push, repel, or otherwise displace the second end 132 of the reflecting lens 130 from the retracted position 150 in the first wall 112 to the extended position 151. In another embodiment, the input energy 95 may activate the actuator 140, as an electrostatic microactuator, to pull or otherwise displace the second end 132 from the extended position 151 to the retracted position 150. In yet another embodiment, the actuator 140 may be integrated to the reflecting lens 130 as a piezoelectric microactuator such that the input energy 95 may bend or otherwise displace the reflecting lens 130 at the angle 152 relative to the first wall 112.

The input energy 95 may be articulated to adjust the angle 152 of the extended position 151. For example, the extended position 151 may be defined by the angle 152 of approximately 45 degrees relative to the first wall 112. As another example, the input energy 95 may be articulated to adjust the angle 152 to approximately 30 degrees relative to the first wall 112. As yet another example, the input energy 95 may be articulated to adjust the angle 152 to approximately 15 degrees relative to the first wall 112.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An optical adapter for an optical scope, wherein the optical scope includes a tube defining a conduit, and wherein the optical adapter is coupled to an end of the tube, and wherein the optical adapter defines a proximate end and a distal end, the optical adapter comprising:
   a casing defining a longitudinal direction, wherein the casing includes a first wall and a second wall, wherein the first wall and the second wall define a first viewing port therebetween, wherein the second wall defines a second viewing port, and wherein the first wall defines a recess therein;
   a hinge coupled to the first wall;
   a reflecting lens defining a first end separated from a second end in the longitudinal direction, wherein the first end is coupled to the hinge; and
   an actuator coupled to the first wall and to the second end of the reflecting lens, wherein the actuator pivots the reflecting lens about the hinge from a retracted position adjacent to the first wall to an extended position toward the second wall,
   wherein in the retracted position, the reflecting lens resides in the recess such that the reflecting lens is flush with the first wall.

2. The optical adapter of claim 1, wherein the recess defines a depth approximately at least equal to a thickness of the reflecting lens.

3. The optical adapter of claim 1, wherein the first wall and the second wall of the casing are approximately parallel and extended in the longitudinal direction from the hinge toward the distal end of the optical adapter.

4. The optical adapter of claim 1, wherein the casing defines a rectangular cross section from at least the hinge to the distal end of the optical adapter.

5. The optical adapter of claim 1, wherein in the retracted position the optical adapter defines a first direction of view through the first viewing port and in the extended position the optical adapter defines a second direction of view through the second viewing port.

6. The optical adapter of claim 1, wherein the hinge pivots the reflecting lens to the extended position, and wherein the extended position defines an approximately 45 degree angle or less relative to the first wall.

7. The optical adapter of claim 1, wherein the second viewing port is approximately 90 degrees or less relative to the first viewing port.

8. The optical adapter of claim 1, wherein the actuator is an electromagnetic actuator, an electrostatic actuator, or a piezoelectric actuator.

9. The optical adapter of claim 1, further comprising:
   a viewing lens positioned between the first wall and the second wall of the casing.

10. The optical adapter of claim 1, wherein in the retracted position, the reflecting lens and the hinge are flush with the first wall.

11. The optical adapter of claim 1, wherein the casing defines a rectangular cross-section from the hinge to the distal end, and wherein the recess is defined between a first portion of the first wall and a second portion of the first wall.

12. An optical scope, the optical scope comprising:
    a tube defining a conduit; and
    an optical adapter coupled to an end of the tube, wherein the optical adapter defines a proximate end and a distal end, the optical adapter comprising:
       a casing defining a longitudinal direction, wherein the casing includes a first wall and a second wall, wherein the first wall and the second wall define a first viewing port therebetween, wherein the second wall defines a second viewing port, and wherein the first wall defines a recess therein;
       a hinge coupled to the first wall;
       a reflecting lens defining a first end separated from a second end in the longitudinal direction, wherein the first end is coupled to the hinge; and
       an actuator coupled to the first wall and to the second end of the reflecting lens and positioned at least partially within the recess, wherein the actuator moves the reflecting lens from a retracted position adjacent to the first wall to an extended position,
       wherein in the retracted position, the reflecting lens resides in the recess such that the reflecting lens is flush with the first wall.

13. The optical scope of claim 12, wherein the recess defines a depth approximately at least equal to a thickness of the reflecting lens.

14. The optical scope of claim 12, wherein the first wall and the second wall of the casing are approximately parallel and extended in the longitudinal direction from the hinge toward the distal end of the optical adapter.

15. The optical scope of claim 12, wherein in the retracted position the optical adapter defines a first direction of view through the first viewing port and in the extended position the optical adapter defines a second direction of view through the second viewing port.

16. The optical scope of claim 12, wherein the hinge pivots the reflecting lens to the extended position, and wherein the extended position defines an approximately 45 degree angle relative to the first wall.

17. The optical scope of claim 12, wherein the second viewing port is approximately 90 degrees relative to the first viewing port.

18. The optical scope of claim 12, the optical scope further comprising:
   an energy supply, wherein the energy supply provides an input energy to the actuator of the optical adapter.

19. The optical scope of claim 18, wherein the actuator of the optical adapter is an electromagnetic actuator, an electrostatic actuator, or a piezoelectric actuator.

20. The optical scope of claim 12, wherein the first wall is fixed.

21. An optical adapter for an optical scope, wherein the optical scope includes a tube defining a conduit, and wherein the optical adapter is coupled to an end of the tube, and wherein the optical adapter defines a proximate end and a distal end, the optical adapter comprising:
   a casing defining a longitudinal direction, wherein the casing includes a first wall and a second wall, wherein the first wall and the second wall define a first viewing port therebetween, wherein the second wall defines a second viewing port, and wherein the first wall defines a recess therein;
   a hinge fixedly coupled to the first wall;
   a reflecting lens defining a first end separated from a second end in the longitudinal direction, wherein the first end is coupled to the hinge; and
   an actuator coupled to the first wall and to the second end of the reflecting lens, wherein the actuator pivots the reflecting lens about the hinge from a retracted position adjacent to the first wall to an extended position toward the second wall,
   wherein in the retracted position, the reflecting lens resides in the recess such that the reflecting lens is flush with the first wall.

22. The optical adapter of claim 21, wherein the first wall is fixed.

* * * * *